H. F. JOEL.
SECONDARY BATTERY.
APPLICATION FILED OCT. 11, 1907.

916,321. Patented Mar. 23, 1909.

Witnesses.

Inventor
H. F. Joel
By Wilkinson Fisher & Witherspoon
their Attorneys

UNITED STATES PATENT OFFICE.

HENRY FRANCIS JOEL, OF FOREST GATE, ENGLAND.

SECONDARY BATTERY.

No. 916,321.  Specification of Letters Patent.  Patented March 23, 1909.

Application filed October 11, 1907. Serial No. 396,999.

*To all whom it may concern:*

Be it known that I, HENRY FRANCIS JOEL, a subject of the King of Great Britain, residing at Forest Gate, in the county of Essex, in England, have invented certain new and useful Improvements in Secondary Batteries, of which the following is a specification.

My invention relates to improvements in the construction of secondary batteries, plating baths and the like in which positive and negative elements are employed immersed in acidulated liquid the whole being contained in an outside receptacle to form a complete cell; and the objects of my improvements are, first, to produce an automatic and continuous circulation of the electrolyte; second, to remove any gases clinging to the surfaces of the electrodes; and third, to bring all the dense electrolyte from the bottom of the cell into active circulation. I attain these objects by the mechanism illustrated in the accompanying drawing, in which:—

Figure 5:
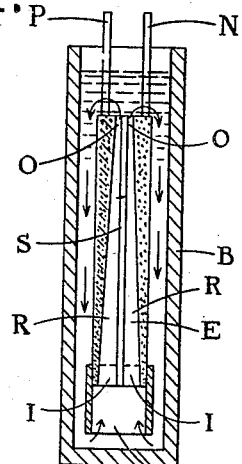
Figure 4:
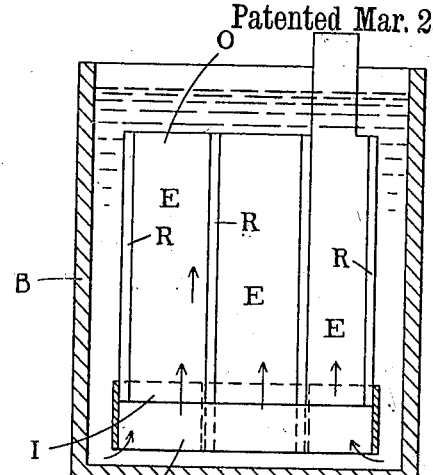
Figure 2:
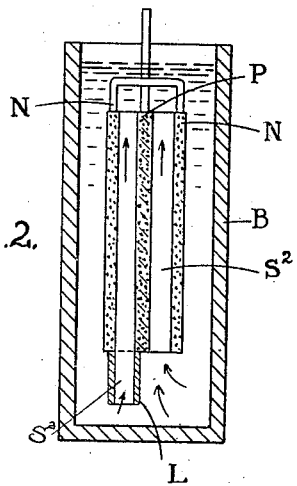
Figure 1:
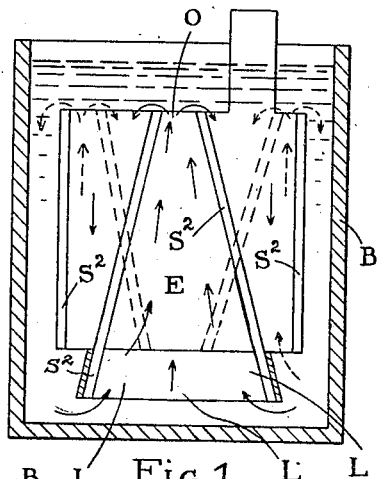
Figure 6:
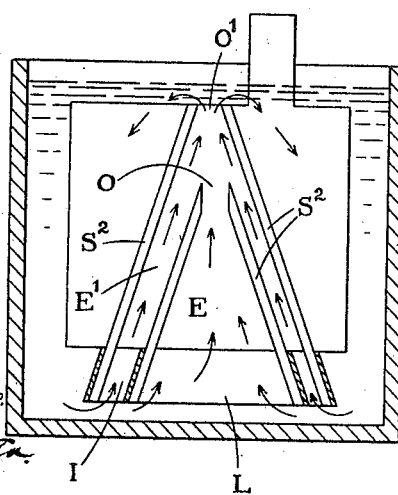

Figure 1, is a side elevation of a cell partly in section showing an electrode with tapered channels formed by inclined separating strips. Fig. 2, is an end section, and Fig. 3, a horizontal section of Fig. 1. Fig. 4, shows an electrode with tapered channels formed by transversely tapering electrodes. Fig. 5, is a vertical section of Fig. 4, and Fig. 6, shows an electrode having a secondary tapering channel within the first.

Similar letters refer to similar parts throughout the several views.

By providing channels between the electrodes which taper off toward their top ends the gas evolved from the faces of the electrodes, gathering volume as it reaches the narrowed outlets of the channels, draws up the liquid electrolyte and forces it over the top of the electrode to fall again to the bottom on the outside, the dense electrolyte at the bottom is thus utilized to take the place of that drawn up; special members extending downwardly from the electrodes which hereinafter I call "leaders" are used to direct the fresh electrolyte toward the openings between the electrodes.

Figure 3:
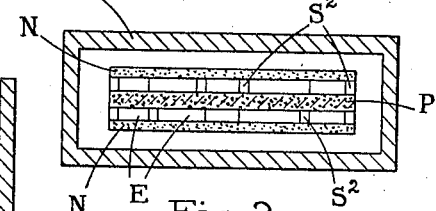

Figs. 1, 2, and 3 show a cell containing a positive electrode P placed centrally of two negative electrodes N, N, all the electrodes are parallel flat plates and they are kept insulated from each other by parallel strips $S^2$, which latter are held slanting in regard to each other so as to form a tapering channel from the inlet I to the outlet O; incidentally the reversely tapered adjoining channels may be formed by the end separating strips $S^2$ and their widths may be so proportioned that the flow of liquids is approximately equal in volume and speed over the whole surfaces of the electrodes at or about an equal density and an equal electro-chemical action is thus obtained with more efficient and constant results and with greater durability of the electrodes. The dotted lines show these separators inclined in the reverse direction between the adjacent pairs of electrodes and the arrows indicate the circulation. The central channel is extended downward below the bottom of the electrodes by leaders L fitted to the separators $S^2$, $S^2$ in the form of a tapered box without top or bottom; by this means the dense electrolyte immediately adjoining the bottom is introduced into the tapered channel and rises to the top.

In Figs. 4 and 5, a plate separator is shown and it will be kept central of the tapering electrodes P and N by parallel ridges R, R, thereon forming in a similar way transversely tapered channels having inlets I, I at the bottom and smaller outlets O, O at the top; the extension leader L is provided to bring up the dense electrolyte from the bottom. Instead of the plate separator and ridges on the electrodes, tapered strip separators may equally well be employed in this case. The elastic band by which flat plates are usually secured together will serve to keep them in place. The same effect may be produced by a tapered central positive electrode and two parallel negative electrodes one on either side of the central one with separating strips between them.

Fig. 6, is a sectional elevation showing tubular ducts or channels formed on the surfaces of the electrodes by two pairs of ridges or separators $S^2$, $S^2$, and so arranged that the outlet O, of the central inclosed channel E, is lower than the outlet $O^1$, at the top of the inclosed tubular channel $E^1$, which becomes a leader L, from the bottom to near the top of the cell.

The circulation of the electrolyte through the extension leader L, the inlets I, and up and through the tapered space, or channel E, is aided by the action of the gases rising through and up the adjoining outlets $O^1$, of the tubular inclosures $E^1$ as indicated by the arrows, and the action of the gases in rising up and through the lower outlets O, of the inclosed channel E, by accumulation and ebullition at that contracted part of the channel forces a current from the outlet O¹ and its continuation in turn induces a current through the outlets O, and up the inclosed ducts E¹. The separators S², and inclosed leader L, shown at Fig. 6, are by preference made in one piece, which is detachable and can be fixed in position by flexible bands as before described. This is a convenient arrangement to apply between any two plates of a double or multiple plate battery.

My invention is applicable to almost every form of electrode and separating device in secondary batteries, and it is especially suitable for use in that form of battery in which metal electrodes such as zinc are dissolved and afterward deposited, and for electroplating processes.

I am aware that prior to my invention secondary batteries have been made with vertical channels between the electrodes, or between the electrodes and a separating device; I therefore do not claim such a combination broadly, but

What I claim as my invention and desire to secure by Letters Patent, is:—

1. In a device of the class described, the combination with the positive electrode, of a negative electrode, and insulating means introduced between them, forming tapered channels connecting the dense portions of the electrolyte in the lower part of the cell with the dense portions in the upper part of the cell, said insulating means being separated at their bases from the base of the cell to permit a direct passage of the dense electrolyte at the base of the cell into the channel, whereby gas evolved by the electric current in rising through the narrowed outlets will draw the dense electrolyte up the channel.

2. In a device of the class described, and in combination, a flat positive electrode, a flat plate negative electrode and insulating strips separating the electrodes of which two are inclined to each other, so as to form inclosed tapered channels having their bases separated from the base of the cell to permit a direct passage of the dense electrolyte at the base of the cell into the channel.

3. In a device of the class described, the combination with the positive electrode, of a negative electrode, insulating means introduced between them forming together with the electrodes inclosed tapered channels, and a box like extension open at the top and bottom extending downwardly below the level of the electrodes, substantially as and for the purpose set forth.

4. In a device of the class described, and in combination, a flat plate positive electrode, a flat plate negative electrode, insulating strips separating the electrodes of which two are inclined to each other so as to form inclosed tapered channels extending from the bottom to the top of the cell, and box-like extensions open at the top and at the bottom attached to downward extensions of the separating strips, substantially as described herein, and for the purpose set forth.

In testimony whereof I affix my signature in presence of two witnesses.

HENRY FRANCIS JOEL.

Witnesses:
H. D. JAMESON,
F. L. RAND.